May 26, 1970 H. B. BERG 3,513,649
GRASS CATCHER FOR ROTARY MOWERS
Filed Oct. 11, 1967 2 Sheets-Sheet 1
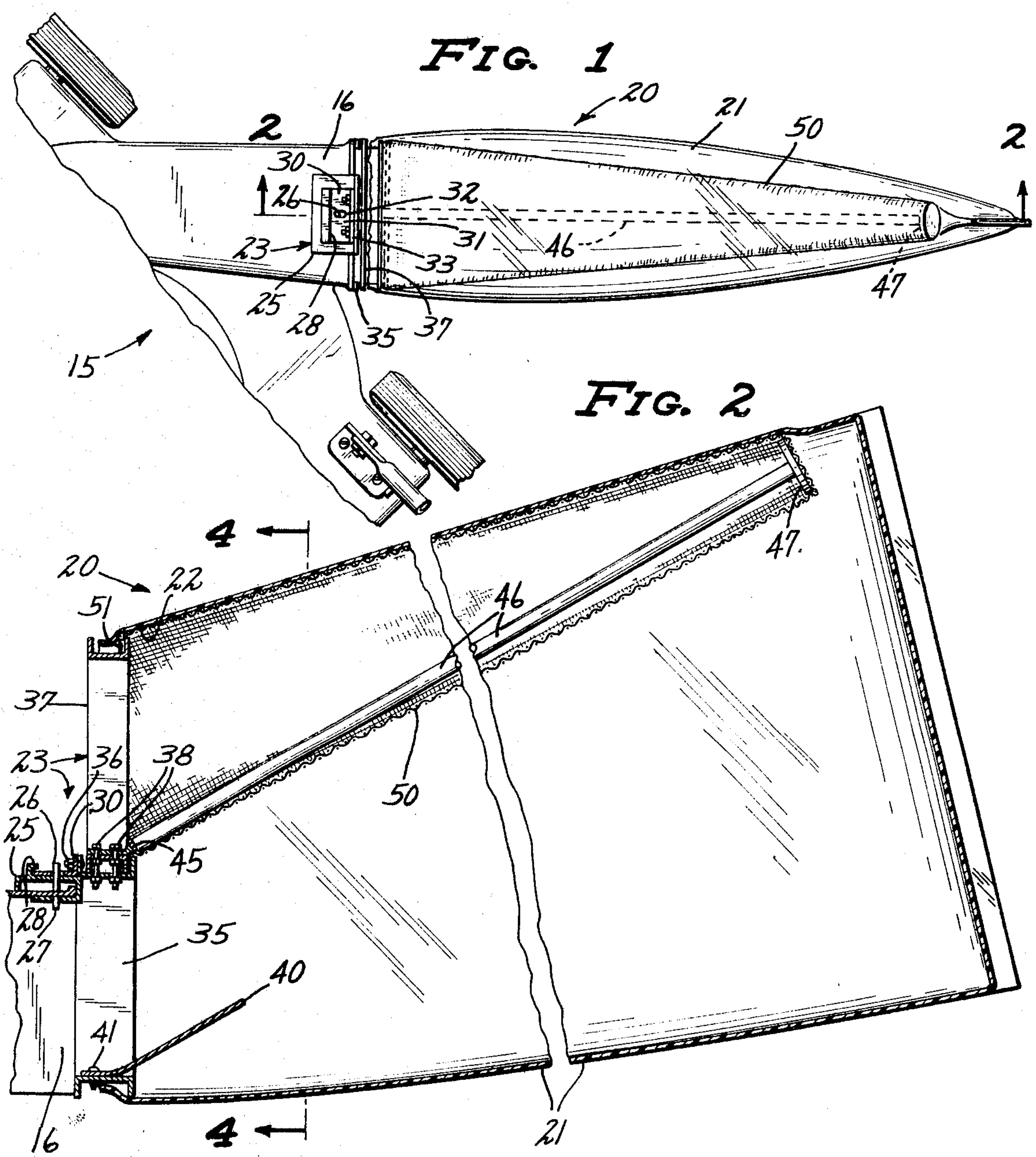
INVENTOR.
HAROLD B. BERG
BY
Merchant & Gould
ATTORNEYS GRASS CATCHER FOR ROTARY MOWERS
Filed Oct. 11, 1967 2 Sheets-Sheet 2
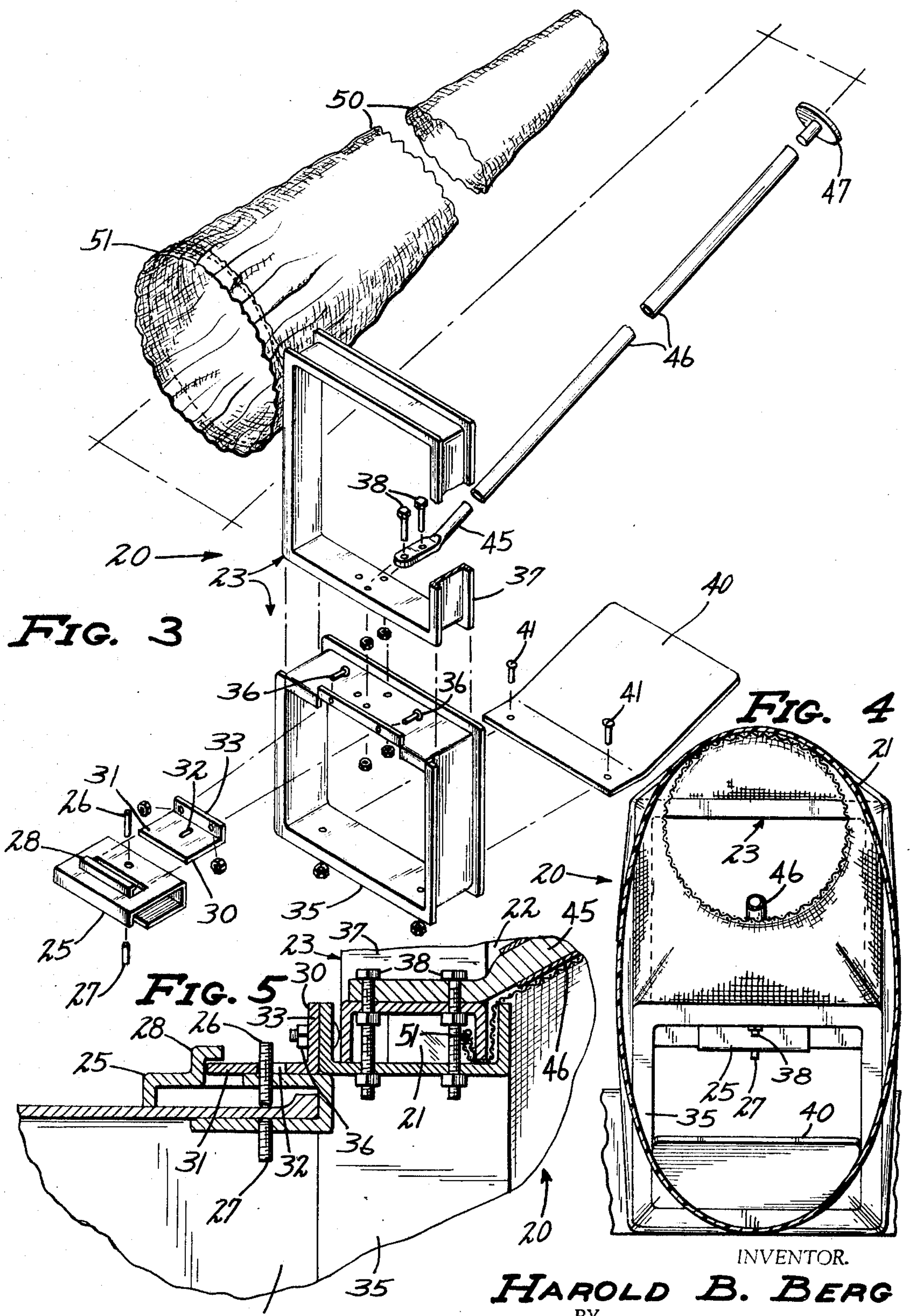
INVENTOR.
HAROLD B. BERG
BY
Merchant & Gould
ATTORNEYS United States Patent Office 3,513,649

Patented May 26, 1970

3,513,649

GRASS CATCHER FOR ROTARY MOWERS

Harold B. Berg, 1110 Welcome Circle,
Golden Valley, Minn. 55427

Filed Oct. 11, 1967, Ser. No. 674,421
Int. Cl. A01d 35/22
U.S. Cl. 56—202 6 Claims

ABSTRACT OF THE DISCLOSURE

An elongated bag closed at one end and open at the other end for receiving grass clippings from a rotary mower and retaining said clippings, and mounting apparatus for securing the open end of the bag in communication with the discharge outlet of the rotary mower. An elongated mesh fabric, tubular member positioned within the bag and defining an outlet at the open end of the bag adjacent the discharge outlet of the mower.

BACKGROUND OF THE INVENTION

Field of the invention

In rotary mowers of the type utilized on lawns and the like, it is the present practice to catch the grass clipping as they leave the mower and to dispose of the clippings so that the lawn is not damaged through accumulation thereof. If general, these clippings are caught and retained in a bag removably attached to the mower and engaged over the outlet thereof. The operation of the rotary mower is such that air produced by the rotating blade and grass clippings from the lawn are forced from the outlet of the mower at relatively high velocities. The grass clippings leaving the outlet of the mower are impelled partially by impetus received directly from the blade and partially because they are entrained by the air forced through the outlet by the blade.

Description of the prior art

In the prior art, perforate bags are affixed over the outlet of the mower so that the air from the mower passes in a generally straight line through the bag and is vented to the atmoshpere. The air leaving the bag is relatively unrestricted so that the sudden increase in volume (or decrease in pressure) as the air leaves the mower outlet and enters the bag, causes the velocity of the air to decrease greatly, whereby, the grass clippings entrained thereby settle out and are retained in the bag. In general, these prior art bags have portions constructed from mesh-type material, which renders these bags relatively expensive and difficult to manufacture. Because of the expense and the complexity of construction, the prior art bags are generally not disposable.

SUMMARY OF THE INVENTION

The present invention is an improved grass catcher for rotary mowers and the like comprising a grass retaining bag having an inlet therein, means for attaching said retaining bag to a rotary mower with said inlet in communication with the grass discharge outlet of said rotary mower, and outlet means positioned at least partially within said retaining bag for providing an outlet for air forced into said retaining bag from said rotary mower outlet and for sharply altering the direction of the air so grass carried thereby is forced away from the air path and packed within the retaining bag.

It is an object of the present invention to provide a new and improved grass catcher for rotary mowers.

It is a further object of the present invention to provide a grass catcher including a much less expensive grass retaining bag therein.

It is a further object of the present invention to provide a grass catcher for rotary mowers wherein the air from the mower outlet is directed generally toward the rear of the retaining bag after which the direction is altered in a generally circular path within the retaining bag through at least 90 degrees to at least partially separate the grass clippings from the air stream.

It is a further object of the present invention to provide a grass catcher for rotary mowers having an increased screen area over the air outlet to partially separate the grass clippings from the air stream and positioned so that at least some self-cleaning action occurs.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a view in top plan of an embodiment of the present invention attached to the discharge outlet of a lawn mower, parts thereof broken away;

FIG. 2 is an enlarged sectional view of the apparatus as seen from the line 2—2 in FIG. 1, parts thereof broken away;

FIG. 3 is an enlarged exploded view in perspective of the apparatus illustrated in FIG. 1 with the retaining bag removed;

FIG. 4 is an enlarged sectional view as seen from the line 4—4 in FIG. 2; and FIG. 5 is an enlarged view in detail of the mounting apparatus.

DESCRIPTION OF THE PREFERRED EMBODIMENTS

Referring to the figures, numeral 15 generally designates a rotary mower having a discharge outlet 16 through which grass clippings entrained by a relatively high velocity stream of air egress. While the mower 15 has the discharge outlet 16 on the side thereof directed generally rearwardly, it should be understood that the present apparatus might be utilized on any of the various mowers and the position or direction of the discharge outlet 16 does not form a part of this invention.

The improved grass catcher illustrated in the figures is generally designated 20, and includes a bag 21, outlet means generally designated 22, and means generally designated 23 for attaching the outlet means 22 and the bag 21 to the outlet 16 of the mower 15. The attaching means 23 includes an adaptor 25 having a generally U-shaped cross section and engaged over the upper lip of the outlet 16 so that the portions of the adaptor 25 forming the legs of the U are substantially horizontal and in overlying and underlying relationship to portions of the upper and lower surfaces of the outlet 16. A pair of set screws 26 and 27 are threadedly engaged through openings in the adaptor 25 so as to bear against the upper and lower surfaces of the outlet 16 and maintain the adaptor 25 fixedly positioned relative thereto. The upper set screw 26 extends upwardly a substantial distance above the upper surface of the adaptor 25 and an L-shaped member 28 is affixed to the upper surface of the adaptor 25 spaced inwardly toward the mower from the set screw 26 with a portion thereof extending vertically upwardly and a portion thereof extending horizontally toward the set screw 26.

The attaching means 23 further includes an attachment bracket 30 having a generally L-shaped cross section with one leg 31 having an approximately centrally located elongated opening 32 therethrough. The size of the attachment bracket 30 is such that the extreme edge of the leg 31 is engaged beneath the horizontally extending leg of the L- shaped member 28, and the set screw 26 is engaged in the opening 32 to maintain the attachment bracket 30 removably attached to the adaptor 25. In this position, a second leg 33 of the attachment bracket 30 extends vertically upwardly and is utilized to mount the remainder of the apparatus.

A first frame member 35 having a generally rectangularly shaped opening therethrough and the periphery thereof formed with a generally channel-like shape opening transversely outwardly, is attached to the vertically upstanding leg 33 of the attachment bracket 30 by some convenient means, such as bolts 36. The frame member 35 is attached to the attachment bracket 30 so as to extend downwardly therefrom in alignment with the discharge outlet 16 of the mower 15, and in general abuting engagement with the lips thereof. A second frame member 37 has a rectangular opening therethrough of substantially the same size, or in some instances somewhat smaller, as the opening through the frame member 35, and the periphery thereof is formed with a transversely outwardly opening channel-like edge having a width somewhat smaller than the width of the frame member 35 so that the lower side of the frame member 37 can be engaged between the upstanding edges of the channel-like upper side of the frame member 35. The frame member 37 is attached to the frame member 35 in the position described by some convenient means such as bolts 38 or the like. In this embodiment, the first frame member 35 forms an inlet for grass clipping and air egressing from the discharge outlet 16, while the second frame member 37 forms an outlet for air egressing from the bag 21.

A baffle plate 40, having a width substantially equal to the horizontal width of the opening through the frame member 35, is attached to the lower side of the frame member 35, by some convenient means such as bolts 41 or the like, so as to extend slightly upwardly and away from the discharge outlet 16. In many instances, such as when the lawn is damp or extremely thick, the grass clippings are extremely heavy and are not readily carried to the rear of the bag 21 by the air egressing through the discharge outlet 16. Also, the velocity of air produced by different types of mowers varies, because of the pitch of the cutting blades, the configuration of the housing, speed, etc. Because of the variations in the velocity of the air leaving the discharge outlet 16 and because of the variations in the weight and texture of the grass clippings, adjustments in the angle between the baffle plate 40 and the horizontal, ranging from relatively flat to a relatively large angle, may be required. These adjustments can be made by simply bending the baffle plate 40, illustrated in the present embodiment, to suit the particular mower to which the grass catcher is attached or, in some more sophisticated grass catchers, the baffle plate 40 may be constructed so as to be adjustable externally.

A foot 45 having a flat portion with a pair of holes therethrough is adapted to be engaged beneath the bolts 38 and against the lower side of the frame member 37. The foot 45 has a cylindrical portion extending generally upwardly and outwardly away from the mower 15. A hollow tubular member 46 is engaged coaxially over the cylindrical portion of the foot 45, and extends outwardly and upwardly to within a short distance of the uppermost rear corner of the bag 21. A disc-shaped member 47, having a cylindrical portion coaxially attached to one side thereof, is affixed to the upper end of the tubular member 46 by engaging the cylindrical portion thereof in the open end of the tubular member 46. The entire assembly including the foot 45, tubular member 46, and the disc-shaped member 47 should be produced with sufficient strength to maintain the bag 21 somewhat above the ground even when it is substantiallly filled with grass clippings.

A generally conical or tubular-shaped member 50 is consrtucted of a flexible meshed fabric, such as wire screen, cloth, or the like. The larger end of the member 50 is open and has elastic affixed therein at 51 so that the member 50 can be readily engaged over the frame member 37, and will be maintained thereon. The longitudinal dimension of the member 50 is approximately equal to the distance of the disc-shaped member 47 from the frame member 37, so that the member 50 will be held in a generally taut position thereby. The smaller end of the member 50 is truncated slightly so that the diameter thereof is approximately equal to the disc-shaped member 47, and may be closed by any convenient means such as sewing or the like. It should be understood that the particular configuration of the member 50, as well as the frame members 35 and 37 may vary somewhat with preferences of individual manufacturers or with different configurations of rotary mowers, and it is fully intended that all such modifications and various embodiments come within the scope of this invention.

With the member 50 engaged over the disc-shaped member 47 and the frame member 37, the frame member 37 is bolted to the frame member 35 by the bolts 38 and the bag 21 is placed over the entire assembly so the opening therein encompasses both of the frame members 35 and 37. In general, the bag 21 is a rectangular type plastic bag with an opening at one end which is slightly smaller than the combination of the frame members 35 and 37, so that the bag 21 has to be stretched slightly to fit therearound. The slight resilience of the plastic forming the bag 21 will maintain it engaged over the frame members 35 and 37 during the filling thereof. Because the bag 21 can be produced in a generally rectangular form with very few operations, such as sewing, forming additional openings therein, attaching meshed fabric thereto, etc., the bag 21 is exceedingly inexpensive, and, therefore, disposable. It should be understood that a plastic bag has been described because of the ease in production and inexpensive quality, however, any other type of bag, such as cloth, etc., can be utilized herein and substantially all of the described advantages will be realized.

In the operation of the present grass catcher, the air and entrained grass clippings enter the bag 21 through the frame member 35 from the discharge outlet 16 of the mower 15. The air has a tendency to travel generally toward the closed end of the bag, and to flow upwardly through the mesh fabric of the member 50. The turning of the air stream toward the member 50 causes at least some of the grass clippings to separate from the air and move downwardly and generally rearwardly. Any grass clippings which remain entrained in the air stream are removed by the mesh fabric of the member 50, and the air egresses from the bag 21 through the opening in the frame member 37. Because of the increased area of mesh fabric on the member 50 (with respect to a portion of the bag having an opening therein and mesh fabric thereover) there is less tendency to plug the outlet and prevent the egress of air from the bag 21. Therefore, the bag 21 can be filled to a much greater extent with grass clippings bfeore it must be emptied or replaced. Also, it is believed that the air entering the bag 21 through the opening in the frame member 35 has a tendency to circulate about the member 50 and provide the member 50 with a certain amount of self-cleaning action. Because of this action and the previously described principles, the bag 21 has a tendency to fill with grass clippings from the rear toward the front and the member 50 remains open for the egress of air therethrough until the bag 21 is substantially filled with grass clippings.

Thus, an improved grass catcher has been disclosed which utilizes an extremely inexpensive and disposable bag to render the task of disposing of the grass clippings much simpler. Further, the grass catcher is designed so that the principles of operation greatly increase the amount of grass clippings which can be collected and retained in a single bag.

What is claimed is:

1. An improved grass catcher for rotary mowers comprising:

(a) frame means defining an inlet and an outlet positioned in juxtaposition to each other;

(b) means for attaching said frame means to a rotary mower with said inlet approximately aligned with the discharge outlet of the rotary mower;

(c) an elongated member perforated to allow air to pass therethrough while substantially preventing the passage of grass clippings and the like and connected to said frame means so as to be in communication with said outlet and so as to extend longitudinally outwardly therefrom; and (d) an elongated bag closed at one end and having an opening at the opposite end affixed to said frame means with said elongated member extending therein and said inlet and said outlet positioned approximately within the opening in said bag.

2. An improved grass catcher for rotary mowers as set forth in claim 1 wherein the elongated bag is an imperforate plastic bag.

3. An improved grass catcher for rotary mowers as set forth in claim 1 wherein the elongated member includes a flexible meshed fabric held in a generally tubular position by at least one elongated member attached to said frame means.

4. An improved grass catcher for rotary mowers as set forth in claim 1 having in addition baffle means mounted adjacent the inlet for directing grass clippings and the like slightly upwardly as they leave the discharge outlet of the mower to cause the grass clippings to be forced further in the general direction of the closed end of the bag.

5. An improved grass catcher for rotary mowers as set forth in claim 1 wherein the inlet defined by the frame means is at least as large as the outlet defined by the frame means.

6. An improved grass catcher for rotary mowers comprising:

(a) an elongated grass retaining bag closed at one end and having an opening at the opposite end;

(b) means for attaching said retaining bag to a rotary mower with the opening in communication with the discharge outlet of said rotary mower;

(c) outlet means affixed to said attaching means and positioned at least partially within the opening in said retaining bag for providing an outlet for air forced into said retaining bag from the discharge outlet of said rotary mower, said attaching means and said outlet means being positioned in the opening of said retaining bag so that air entering said bag from the rotary mower moves generally toward said closed end of said retaining bag after which the air generally reverses direction to exit through said outlet means and the retaining bag is removable and disposable.

References Cited

UNITED STATES PATENTS 2,918,694 12/1959 Tarrant ............. 56—202

2,970,422 2/1961 Kroll et al. .......... 56—202

RUSSELL R. KINSEY, Primary Examiner